United States Patent [19]
Sullivan

[11] Patent Number: 5,280,343
[45] Date of Patent: Jan. 18, 1994

[54] SEPARABLE SUBSAMPLING OF DIGITAL IMAGE DATA WITH GENERAL PERIODIC SYMMETRY

[75] Inventor: James R. Sullivan, Spencerport, N.Y.

[73] Assignee: Eastman Kodak Company, Rochester, N.Y.

[21] Appl. No.: 822,768

[22] Filed: Jan. 21, 1992

[51] Int. Cl.$^5$ .............................................. H04N 11/06
[52] U.S. Cl. .................................... 358/12; 358/21 R
[58] Field of Search . 358/12, 11, 13, 21 R, 133, 138, 140, 141; H04N 11/20, 11/06, 11/04, 7/04

[56] References Cited

U.S. PATENT DOCUMENTS

| | | | |
|---|---|---|---|
| 4,432,009 | 2/1984 | Reitmeier et al. | 358/22 |
| 4,531,151 | 7/1985 | Hentschke | 358/135 |
| 4,621,286 | 11/1986 | Reitmeier et al. | 358/141 |
| 4,670,773 | 6/1987 | Silverberg | 358/12 |
| 4,713,688 | 12/1987 | Guttner | 358/144 |
| 4,723,157 | 2/1988 | Wendland et al. | 358/12 |
| 4,782,387 | 11/1988 | Sabri et al. | 358/133 |
| 4,866,519 | 9/1989 | Lucas et al. | 358/140 |
| 4,979,022 | 12/1990 | Snashall et al. | 358/22 |
| 4,979,041 | 12/1990 | Schreiber | 358/141 |
| 5,136,374 | 8/1992 | Jayant et al. | 358/133 |
| 5,159,453 | 10/1992 | Dhein et al. | 358/142 |

FOREIGN PATENT DOCUMENTS 2138238 10/1984 United Kingdom .

OTHER PUBLICATIONS

IBA, "The Sampling of Television Images", G. J. Tonge, May, 1981; pp. 1-36.

A Computer Design in an article entitled "Video Compression Scheme", pp. 180-181.

Primary Examiner—Victor R. Kostak
Assistant Examiner—Nathan J. Flynn
Attorney, Agent, or Firm—Thomas H. Close

[57] ABSTRACT

General periodic, non-rectangular subsampling of color image data is accomplished with separable filters by convolving a periodically upsampled version of the color image with rotated one-dimensional filters and subsampling in a raster format.

10 Claims, 15 Drawing Sheets

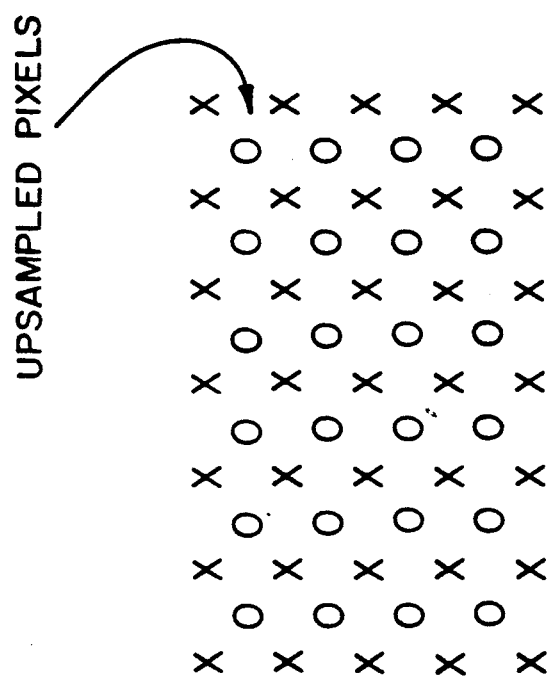

CHROMINANCE
8:1

LUMINANCE
2:1

… …

SEPARABLE SUBSAMPLING OF DIGITAL IMAGE DATA WITH GENERAL PERIODIC SYMMETRY

TECHNICAL FIELD

The present invention relates to the field of digital image processing and more particularly, to a method for decomposing digital color image data into general periodic spatial frequency regions with separable filters and raster subsampling.

BACKGROUND ART

Many monochrome and color digital imaging systems have components that perform pixel and line raster subsampling for the purpose of reducing the amount of image data for storage, transmission, or display. NTSC television is an example wherein filtering and rectangular subsampling of chrominance data as well as line subsampling and interlaced display of the image are used to reduce the required system bandwidth.

Other examples are image subband coding and pyramid coding wherein a bank of low-pass and high-pass filters and image subtraction are used with subsampling to isolate and independently quantize certain image frequency regions.

In most applications, the filtering and subsampling are separable in the horizontal and vertical directions with simple one-dimensional filters that avoid spatial aliasing. This is illustrated in FIG. 1, which shows the Nyquist boundaries ($N_x$, $N_y$) of a rectangularly sampled input image and the filtered and subsampled Nyquist boundaries due to separable filtering and 2:1 integer subsampling. Four rectangular Nyquist regions can be isolated by having horizontal and vertical low-pass and high-pass filters. These are represented in FIG. 1 by L/L, L/H, H/L, and H/H. The signal flow diagram is shown in FIG. 2 where the $\downarrow 2$ symbol represents 2:1 subsampling. Although simple to implement, it is well known that separable decomposition of the input Nyquist region has quality disadvantages for reducing image data. The reasons are related to observed symmetries of image data and the preferred symmetry of the human visual system. FIG. 3a shows a typical power contour in the spatial frequency domain for one color of a digitally scanned image. The predominance of horizontal and vertical image modulation is due in part to the high degree of rectangular symmetry in man-made and naturally occurring objects, but also to the modulation transfer function or MTF of digital scanners that results from rectangular sensor elements and anisotropic optics.

The MTF of the human visual system is also anisotropic with the well documented decrease in acuity at 45° and 135° as shown in FIG. 3b. This preferred symmetry has been used to design reduced resolution, single-chip color sensor arrays for electronic cameras by placing red, green, and blue sensitive pixels in periodic, non-rectangular arrangements to better match image symmetry and to minimize visual resolution loss. There have also been numerous attempts to take advantage of this preferred symmetry in television systems to maintain the current bandwidth and improve the spatial-temporal quality, and to develop systems that allow for auxiliary channels to convert NTSC quality signal to high-definition television signals. In addition, non-rectangular symmetry has been used in image subband coding to improve the rate-distortion performance of image compression systems. To date, all of these methods have used non-separable, two-dimensional filters and diamond or quincunx subsampling to filter or decompose the image. A good, general presentation of this for television signals is given in a 1981 Independent Broadcasting Authority (IBA) Report, 112/81, May, 1981, by G. Tonge. Although non-separable, two-dimensional filters are quite general and have the flexibility to produce the desired filter responses, they are difficult to design, and more importantly difficult to implement requiring order $M^2$ multiplies and additions per subsampled pixel for an MxM filter. Separable filtering and subsampling has significant implementation advantages because the required processing is reduced to order M with Mx1 and 1xM filters. Since M often ranges from 7-11 for image processing applications, this can be an order of magnitude reduction. A novel use of cascaded, separable filters to generate the non-rectangular, diamond symmetry of FIG. 3a was introduced by E. Guttner in U.S. Pat. No. 4,713,688, entitled "Method For Increasing Resolution Of A Compatible Television System", which issued Dec. 15, 1987 to equilibrate the horizontal and vertical resolution of color television while maintaining bandwidth compatibility with existing systems. The system required a higher resolution TV camera with a two-fold increase in spatial sampling, and used diagonal one-dimensional filters and offset modulation to produce a low-pass, diamond subsampled image with equal line and pixel resolution. Although closest to the present invention, all filtering was low-pass and the higher resolution information of the input camera was discarded. Schreiber, of the Massachusetts Institute of Technology expanded this concept in U.S. Pat. No. 4,979,041, entitled "High Definition Television System", which issued Dec. 18, 1990 to the use of non-rectangular quadrature mirror filters to decompose the image into subbands with the low-pass subbands being compatible with the bandwidth of current television channels and receivers, and the high-pass subbands providing a "bridge" to enhanced definition and high definition television (EDTV and HDTV). He proposed a one-dimensional version of the quadrature mirror filtering by "diagonally addressing frames of image data held in a frame store and passing the diagonally-addressed data through vertical and horizontal filters". The disadvantage of this approach, as compared to the present invention, is that it requires a complete frame store at the transmitter and receiver, and it is limited to diamond symmetry, and without the upsampling step of the present invention can cause severe aliasing in the subbands. This will be described in more details later in the specification.

SUMMARY OF THE INVENTION

It is the object of the present invention to provide a general method for reducing full resolution rectangularly sampled digital color image data to non-rectangularly subsampled image data using one-dimensional separable filters and subsampling.

The objects of the present invention are achieved by using non-rectangular upsampling, rotated one-dimensional filters, and line-by-line raster subsampling to accomplish non-rectangular subsampling of rectangularly sampled image data.

It is still another object of the present invention to provide a method of subsampling a digital color image to decompose said image data into general periodic spatial frequency regions comprising the steps of converting the input color image data into a chosen color space using a color transformation and then filtering and subsampling the image data with one dimensional low pass and high pass filters and subsampling at an angle so as to be aligned with the periodicity of the upsampled image, and further filtering and subsampling the resultant subsampled image data with one dimensional low pass and high pass and subsampling in an orthogonal direction to said first one-dimensional filtering and subsampling.

BRIEF DESCRIPTION OF THE DRAWINGS

FIG. 5 is a diagram of the required upsampling process for diamond or quincunx subsampling or image decomposition;

MODES OF CARRYING OUT THE INVENTION

Figure 4:
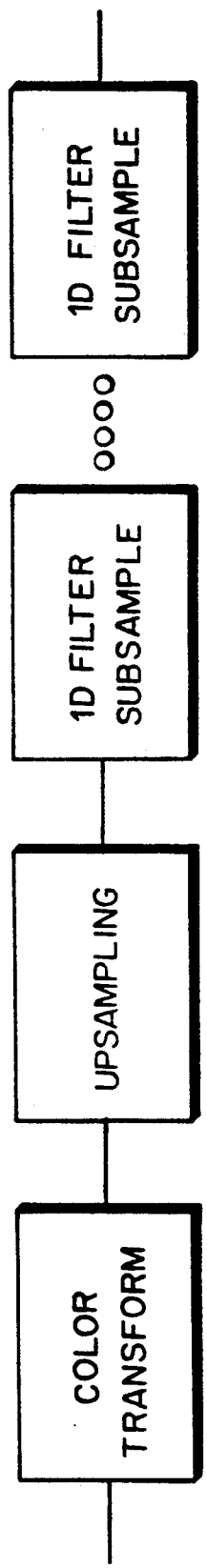
FIG. 4 is a schematic block diagram showing the processing sequence for the method of this invention.
Figure 6A:
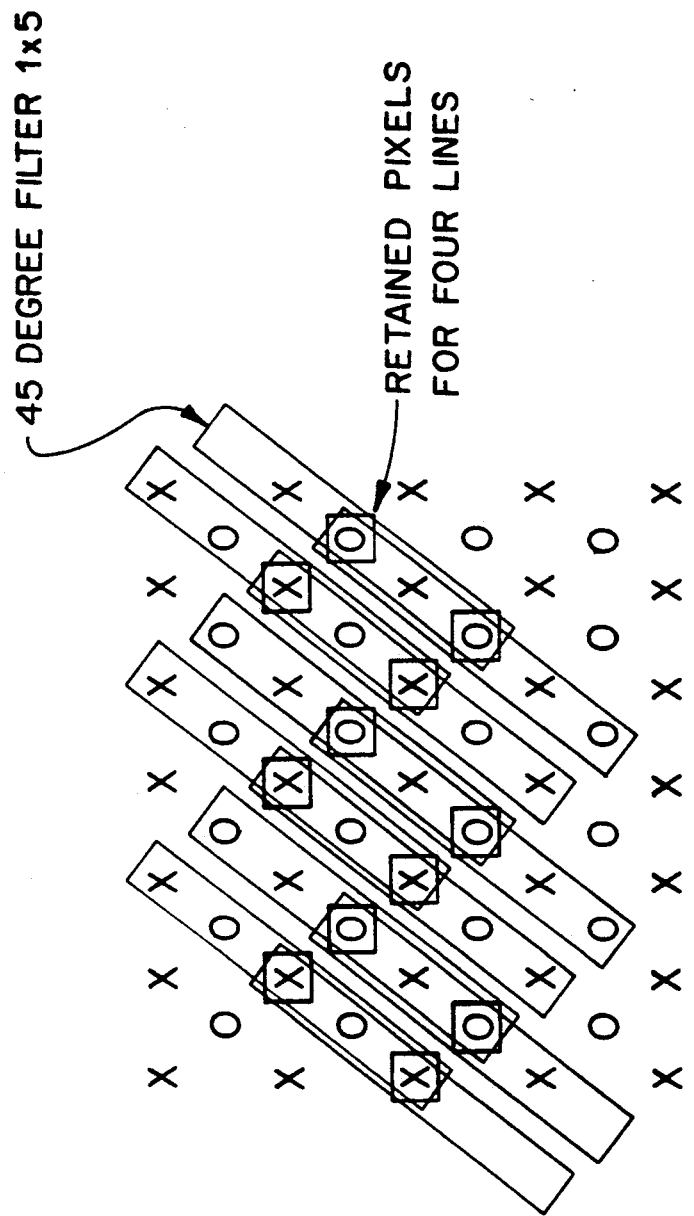
FIG. 6a is a diagram illustrating the 45 degree filtering and raster subsampling for the diamond or quincunx subsampling.

A block diagram of the system is shown in FIG. 4. The color transformation converts the input color data into a uniform color space such as CIELAB or CIELUV where subsampling errors will be uniformly perceived. The second step is to upsample the transformed data to modify the rectangular symmetry of the input data into the preferred symmetry. This is an essential element of the present invention. Functionally, it amounts to placing digital values of zero periodically throughout the image data as new pixels. An example of this unsampling step is shown in FIG. 5, where the X's are the input pixels on a rectangular lattice and the O's are the upsampled new pixels. This particular upsampling pattern which produces a diamond or quincunx symmetry is quite relevant to image processing because it corresponds to the image and visual system symmetries presented previously. This will be discussed in more detail later. The upsampling step is followed by filtering with rotated one-dimensional filters and raster subsampling. These filtering and subsampling components can be cascaded as in FIG. 4 to geometrically isolate successively smaller Nyquist regions. The first stage of filtering with 45 degree one-dimensional filters and raster subsampling is shown in FIG. 6a. The processing of four lines is shown with the central pixel of each filtered block indicated as retained pixels. To avoid unnecessary processing prior to the subsampling, the filter skips every other pixel on each line. In addition, the zero multiplies can be eliminated. In a software or hardware implementation where the upsampled lines are not offset by half a pixel spacing, the 45 filter window has a jagged shape as it moves through the image memory. This can be seen in FIG. 6a by recognizing that the first pixel 0 the first retained line comes from filtering pixels 3, 2, 2, 1, 1, on lines 1 though line 5. Similarly, the first pixel on the second retained line, which is an upsampled line, comes from filtering pixels 3, 3, 2, 2, 1 from lines 2 through 6.

The effect of not upsampling prior to 45 degree filtering and subsampling as taught by U.S. Pat. No. 4,979,041, can be seen most easily in FIG. 6a, where only the X's would be available for processing and retention. As such, the filter would never be centered on an upsampled 0, and values would not be retained at these positions during the 45 degree subsampling. There would be no way to incorporate information from the X's that are skipped in the subsampling into the data that is retained for the subsequent filtering and subsampling step. Without information from these input pixels, uncorrectable aliasing must occur for general signals, causing unavoidable image distortion even for quadrature mirror filters design for perfect image reconstruction.

Figure 6B:
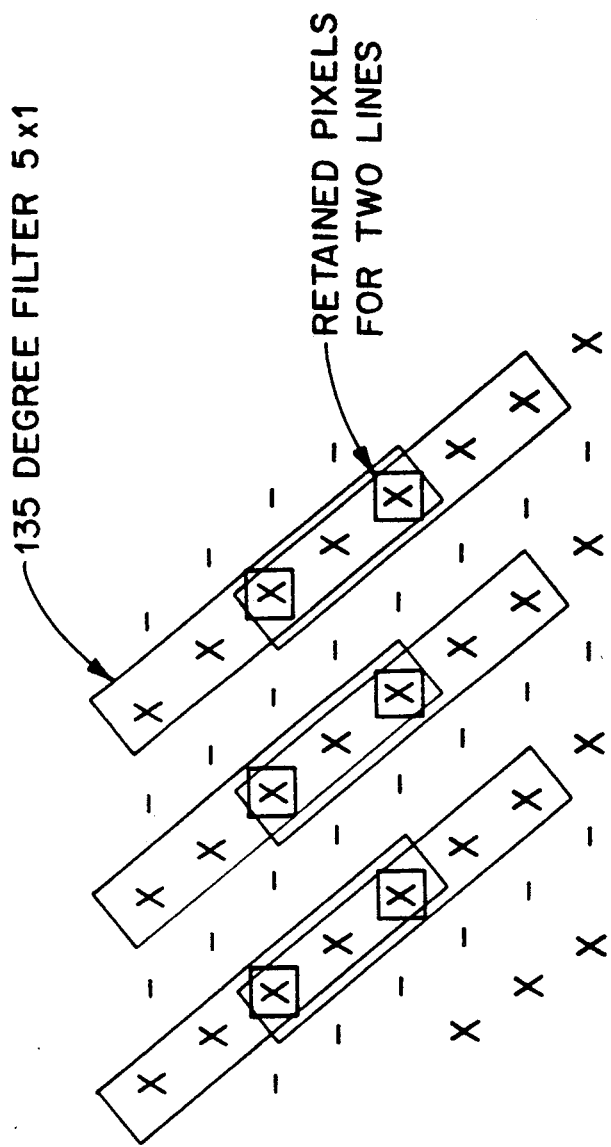
FIG. 6b is a diagram illustrating the 135 degree filtering and raster subsampling for the diamond or quincunx subsampling.

The second filtering and subsampling step with 135 degree filters is shown in FIG. 6b, where the X's represent pixels retained in the first step and the dashes represent pixels skipped in the first step. Notice now that due to the 45 degree filtering, none of the retained pixels from the first step is uniquely zero. As the Figure illustrates, the retained pixels from this second filtering step have a diamond or quincunx symmetry. With the 2:1 upsampling of FIG. 5 and the combined 4:1 subsampling of FIGS. 6a and 6b, the overall reduction in pixels for each combination of 45 and 135 degree filters is 2:1. A low-pass/low-pass combination will isolate a nonrectangular central diamond segment of the input Nyquist region, and a low-pass/high-pass combination will isolate the corners of the input Nyquist region. As discussed above, the central diamond segment contains the majority of the important visual image information and can be quantized to high precision.

The corners, on the other hand, can be quantized more coarsely to reduce the amount of image data without a significant loss in visual quality.

A further refinement of the invention is to continue the decomposition of the central diamond segment into four signals each with one-fourth of the pixels with low-pass/low-pass, low-pass/high-pass, high-pass/low-pass, and high-pass/high-pass separable filters and sub-sampling. As above, each Nyquist region can be independently quantized with different precision to maintain high visual quality with a reduced amount of image data.

Figure 1:
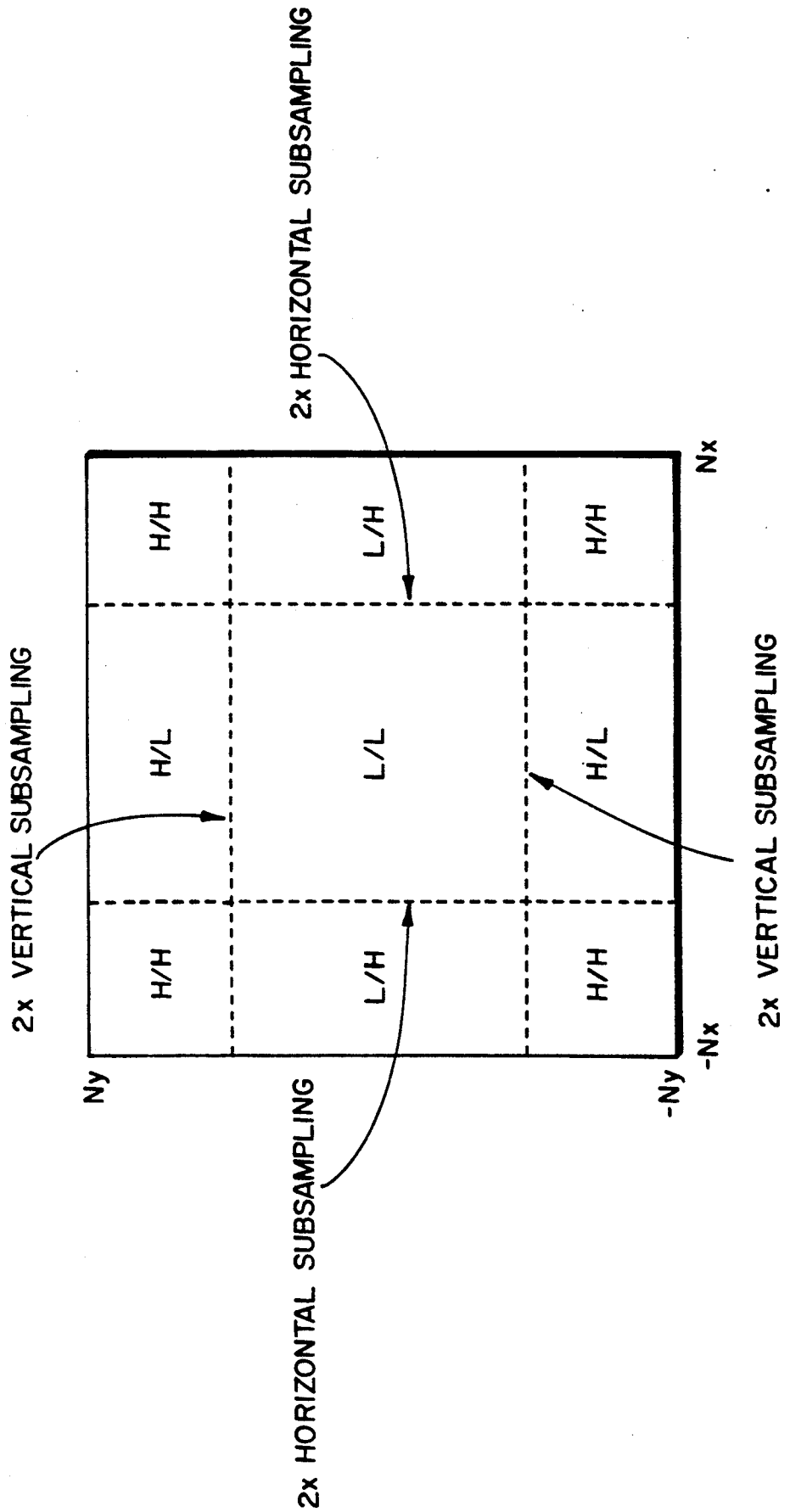
FIG. 1 is a diagram of standard rectangular decomposition of the Nyquist region for digital images produced by separable filters and rectangular integer subsampling.
Figure 2:
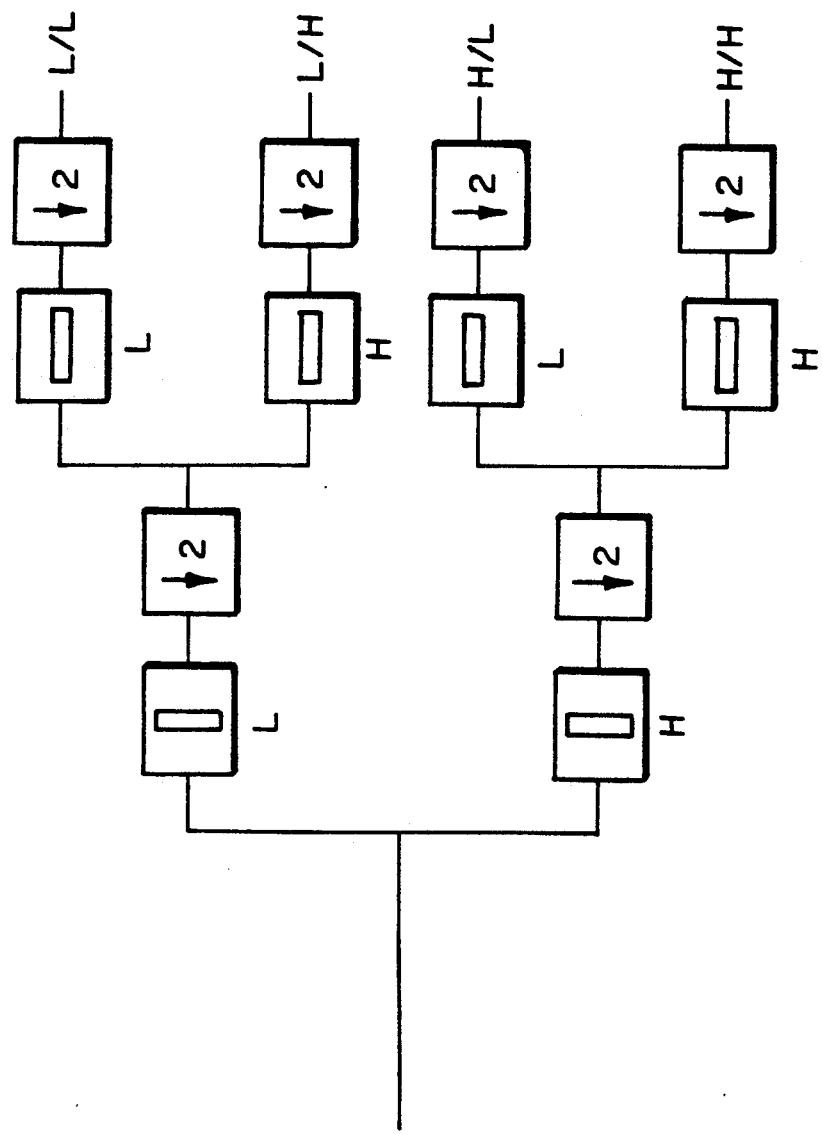
FIG. 2 is a single flow diagram of the standard rectangular subsampling for FIG. 1.
Figure 3A:
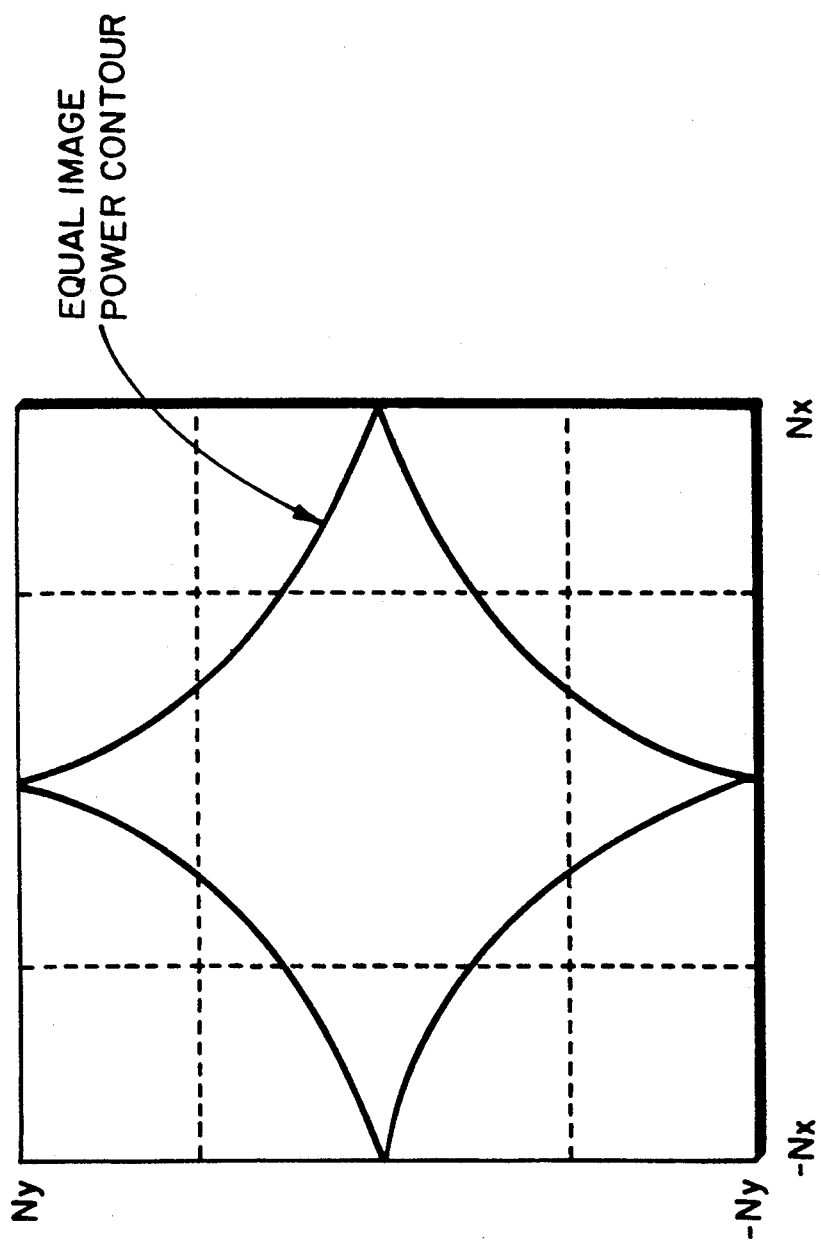
FIG. 3a is a plot that shows a typical power contour for scanned image data in the Fourier Nyquist region.
Figure 3B:
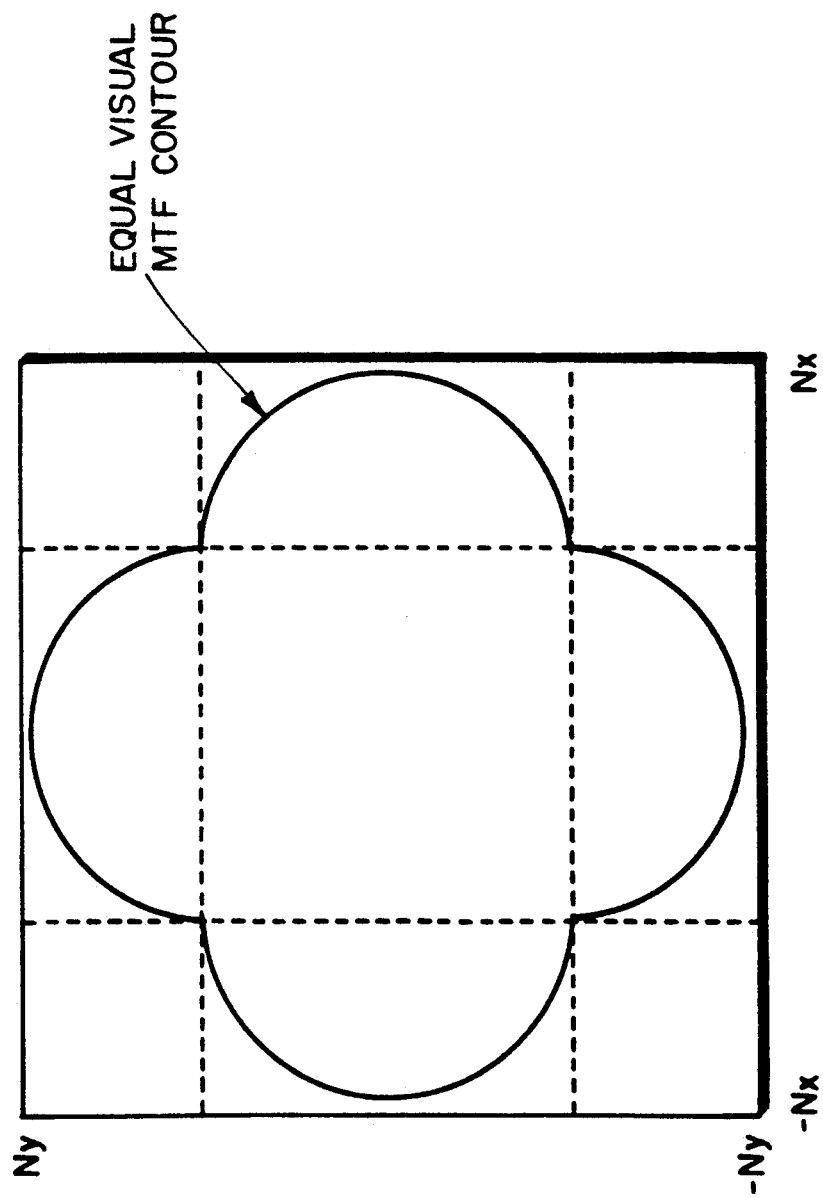
FIG. 3b is a plot that shows the symmetry of the human visual system transfer function in the Fourier Nyquist region.
Figure 7:
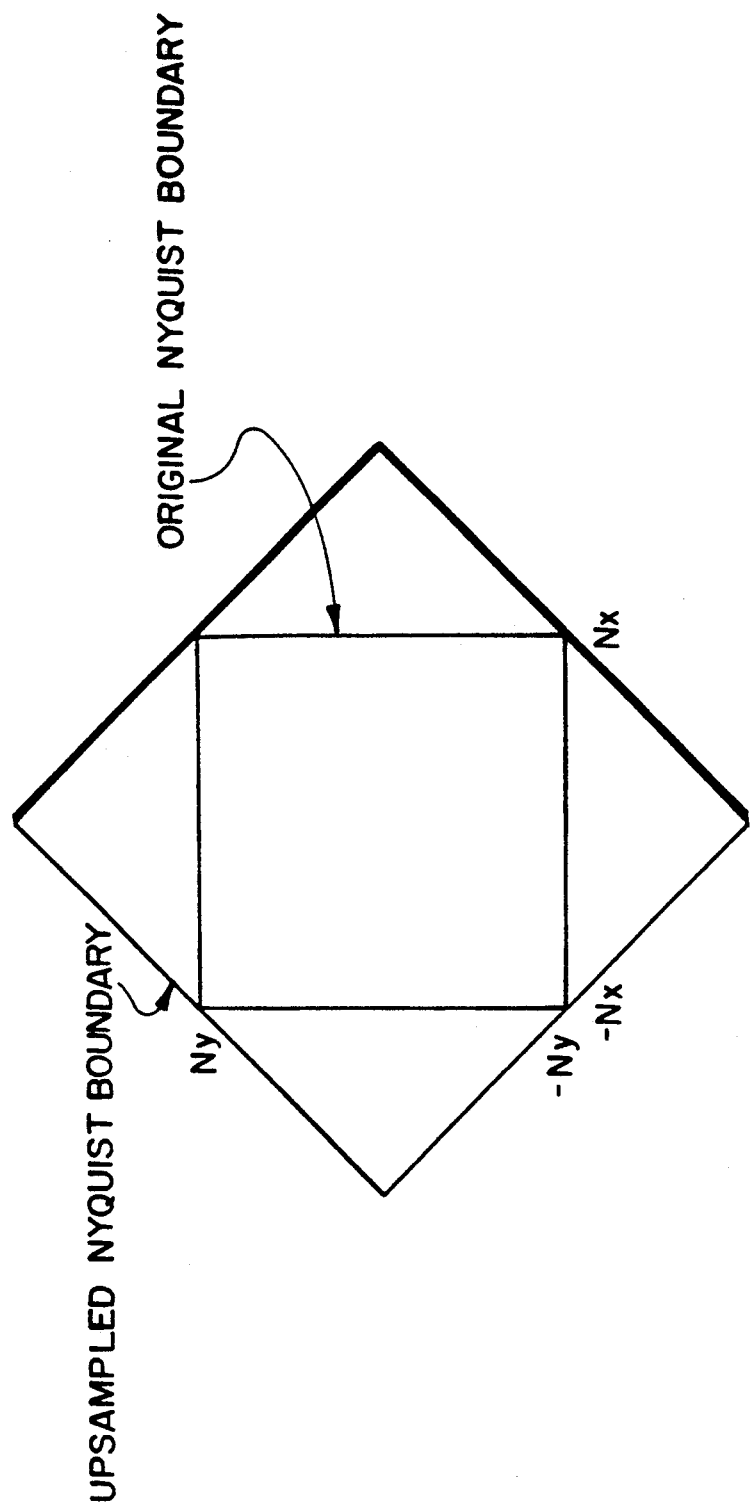
FIG. 7 is a plot showing the effect in the Fourier spatial frequency domain of the upsampling process shown in FIG. 4.
Figure 8:
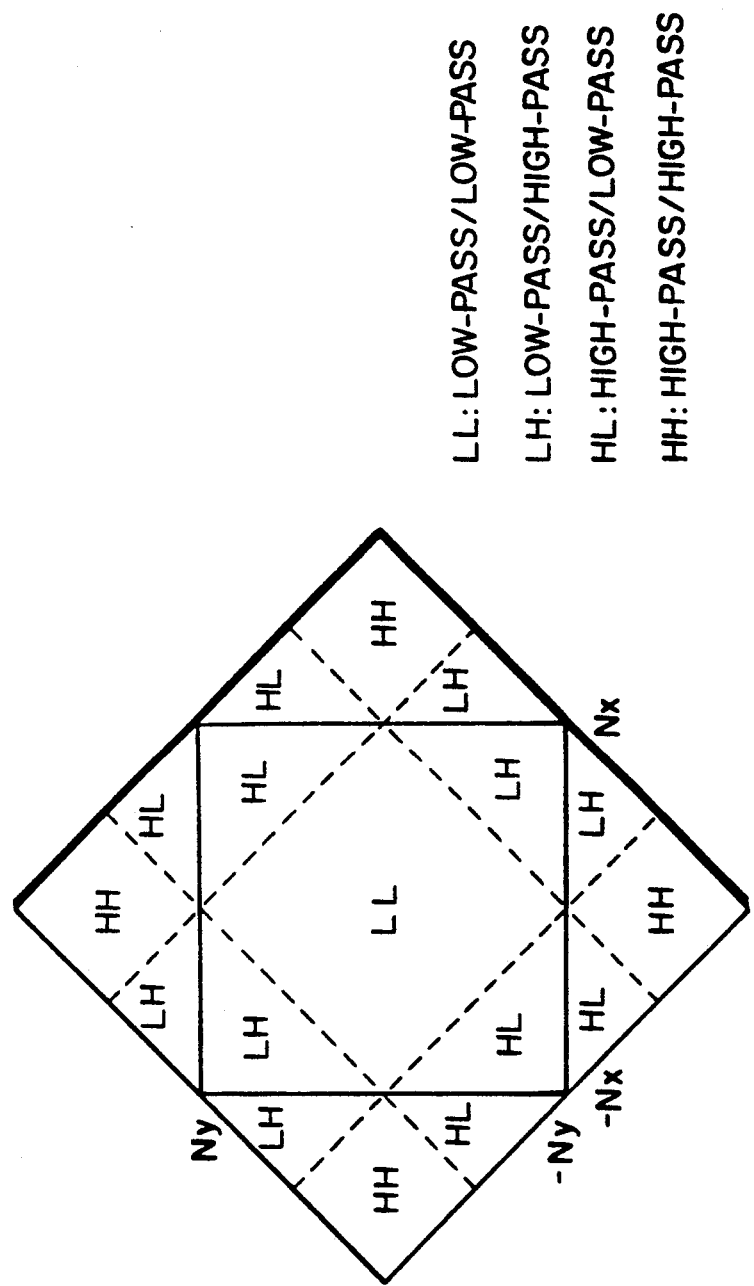
FIG. 8 is a plot showing the Fourier Nyquist regions isolated by the various combinations of low-pass and high-pass filtering and subsampling with diamond or quincunx symmetry.
Figure 9:
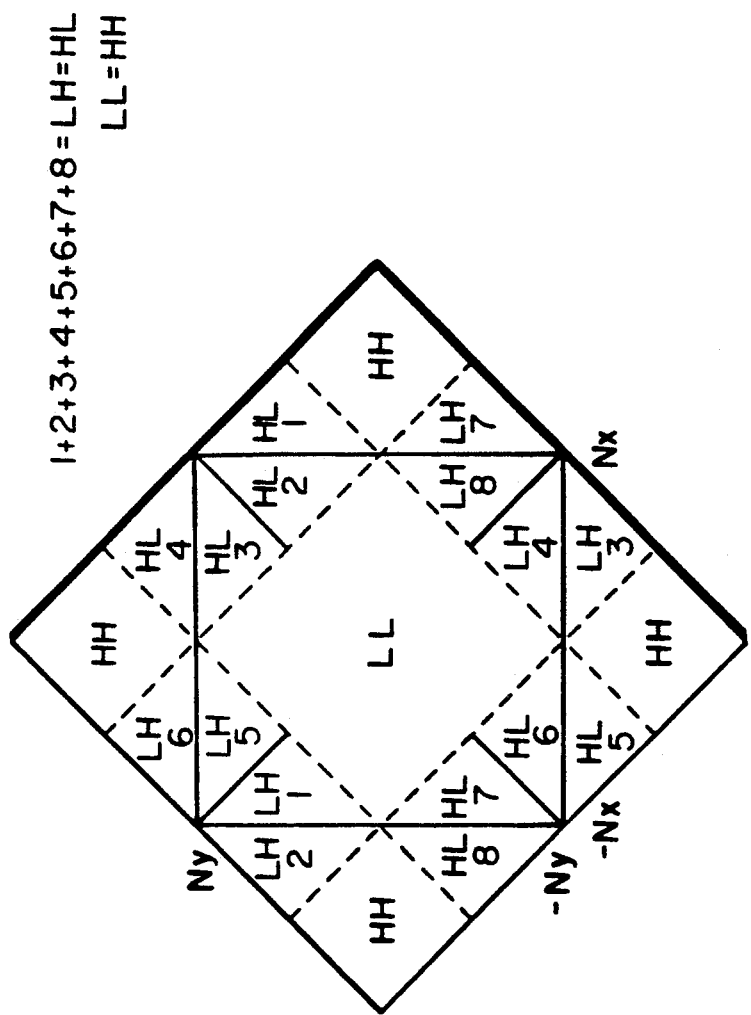
FIG. 9 is a plot showing the redundancy of Fourier Nyquist regions of FIG. 7.
Figure 10:
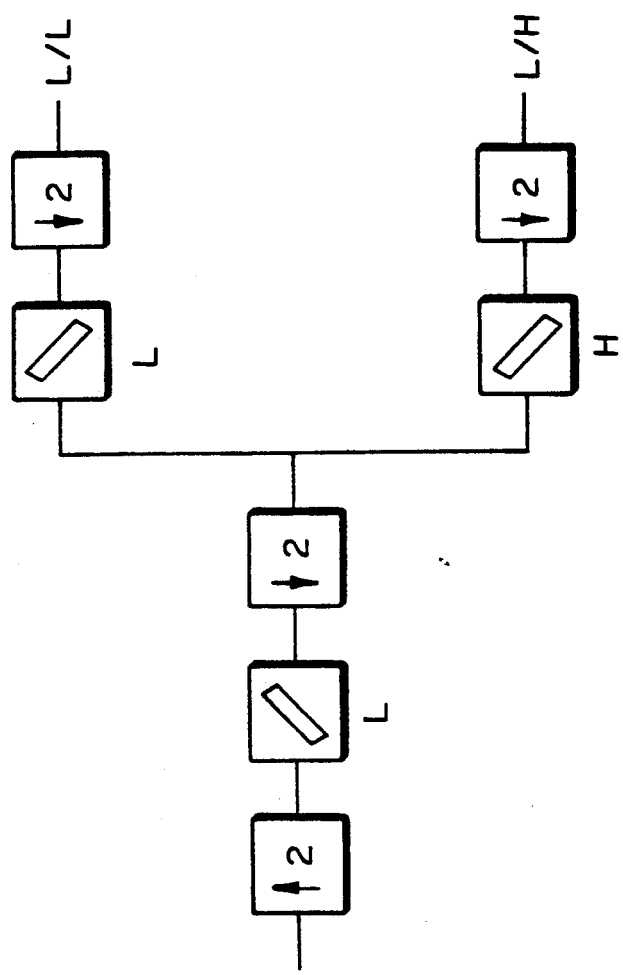
FIG. 10 is a flow diagram showing the system architecture of a two-stage non-separable decomposition of the Nyquist Fourier domain with diamond or quincunx symmetry.
Figure 11:
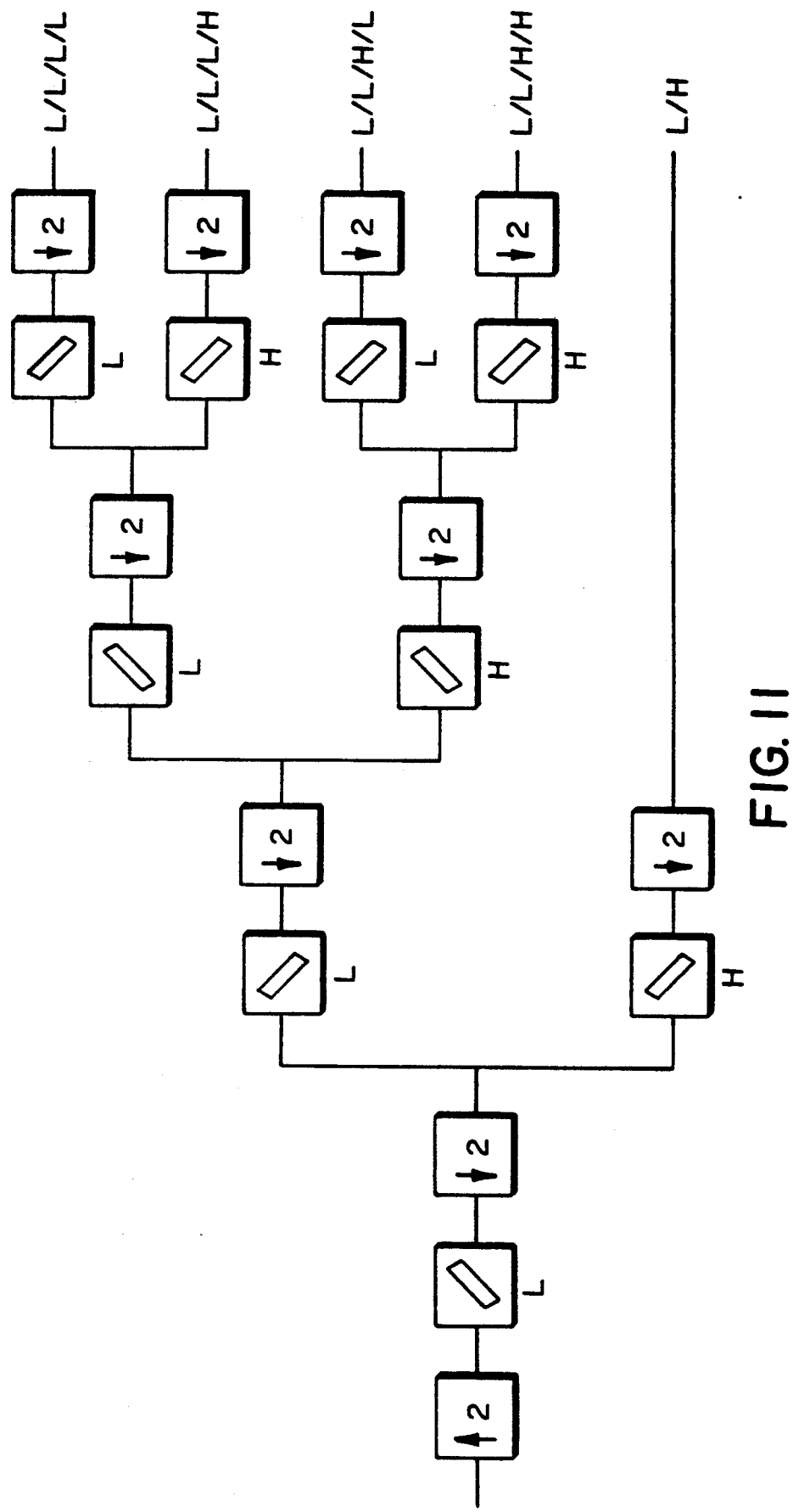
FIG. 11 is a flow diagram showing the system architecture of a multistage non-separable decomposition of the Nyquist Fourier domain with diamond or quincunx symmetry.
Figure 12B:
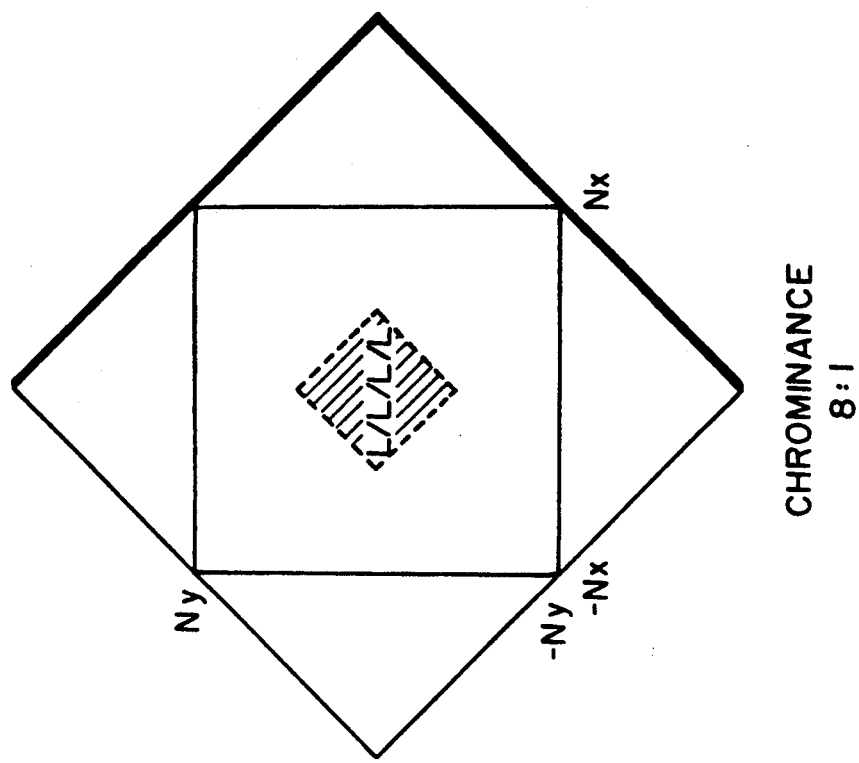
FIGS. 12a and 12b are plots showing the subsampling patterns and the retained cross-hatched Fourier Nyquist regions for one realization of this invention that keeps only the L/L and L/L/L/L regions for the luminance and chrominance channels of a color image respectively.
Figure 12A:
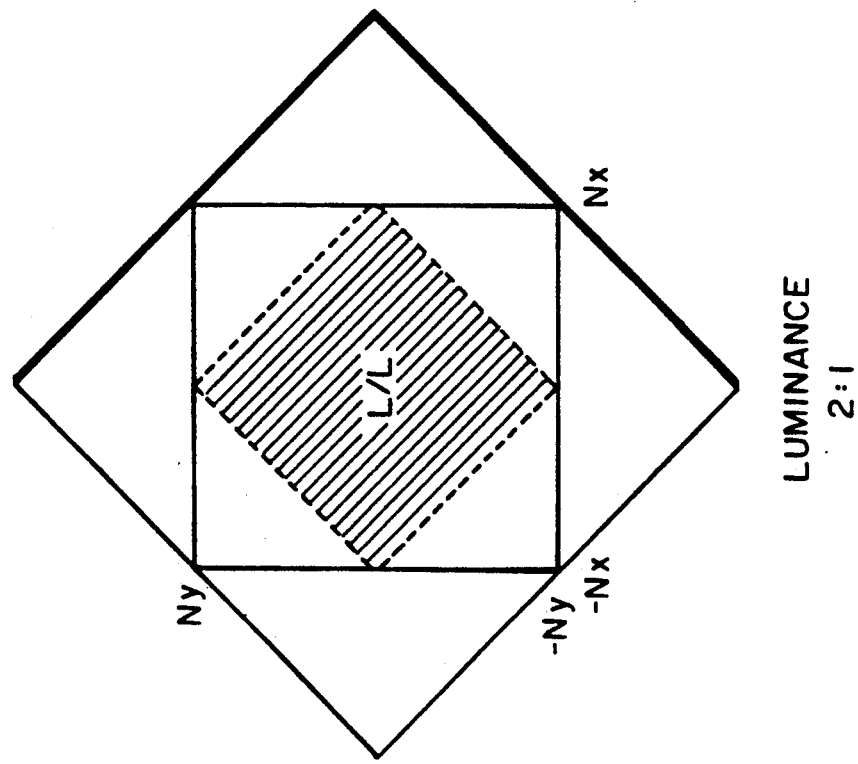

Referring to FIG. 5, since the upsampling process is implemented by placing zeros periodically in the input data, it does not change the image power or modulation, nor does it change the discrete Fourier transform of the image. It does however modify the Nyquist boundary in the spatial frequency domain defined by one-half of the inverse sampling distance between pixels in the two-dimensional image. Again referring to FIG. 5, the 45° and 135° sample distances are not changed by the upsampling, but the horizontal and vertical sample distances are decreased by 2x causing the Nyquist boundaries to increase by 2x. This is shown in FIG. 7. The square input Nyquist region has been converted to a larger 45° rotated square that has a diamond or quincunx symmetry with respect to the input. If the upsampled image is now rotated 45° this diamond Nyquist region will also rotate 45° and it can be segmented as in FIG. 1 into four independent regions or images by subsampling the results of separable horizontal and vertical filters. Each image can then be rotated back by 45° to produce the non-separable Fourier segmentation shown in FIG. 8. The regions in FIG. 8 have been labelled LL, LH, HL, and HH depending on whether the horizontal and vertical filters were low-pass or high-pass respectively. Since rotating an entire image by 45° is a fairly computationality intensive operation, it is important to recognize that the same result can be achieved by rotating the filters. In addition, the subsampling process can occur along the input lines and from line-to-line so that it can be synchronized with the rectangular raster data. The symmetry of FIG. 8 is a good match to the non-rectangular symmetry of image data and the human visual system discussed previously with the region labelled LL containing the most important visual image information. It is necessary to recognize an inherent redundancy in the four images that are generated by the filtering and subsampling. This is best illustrated in the Fourier domain. Remembering by the sampling theorem that the original square sampling caused all of the Fourier domain to be tiled with the input square Nyquist region, FIG. 9 shows that the LH, HL, and non-LL corners labelled 1 through 8 are equivalent. Similarly, it shows that the LL and HH regions are equivalent. It is therefore only necessary to retain the LL and LH output images. The system architecture is shown in FIG. 10. For a standard non-separable decomposition of the input image into these Nyquist regions using an MxM filter $M^2$ multiplications and additions would be required as well as a complex two-dimensional filter design. For the separable decomposition of this invention, the initial, low-pass filter operates on every other pixel of the 2:1 unsampled image with half of the multiplies eliminated due to the pixel values being zero for $M/2$ multiplies and adds. To this is added the second level low-pass and high-pass filtering which each operates on half the data of the first filter requiring $M/2$ multiplies and adds for a total of M multiplies and adds per input pixel. For typical values of M ranging from 7-11, decreasing the required processing from order $M^2$ to order M is an order of magnitude reduction. The system of FIG. 10 can be extended to additional layers as shown in FIG. 11 further isolating smaller and smaller diamond-shaped regions. As an example realization of the method of this invention for reducing color or chrominance image data, the L/L/L/L channel of FIG. 11 with its 8:1 subsampling could be retained for the chrominance information, as shown in FIG. 12b and the L/L channel of FIG. 11 with its 2:1 subsampling could be retained for the luminance information as shown in FIG. 12a. This would amount to an overall data reduction of 4:1, i.e., 3 full resolution color channels would be converted into one ½ resolution luminance channel plus two ⅛th resolution chrominance channels for a total of one ⅜th resolution channel.

Figure 13A:
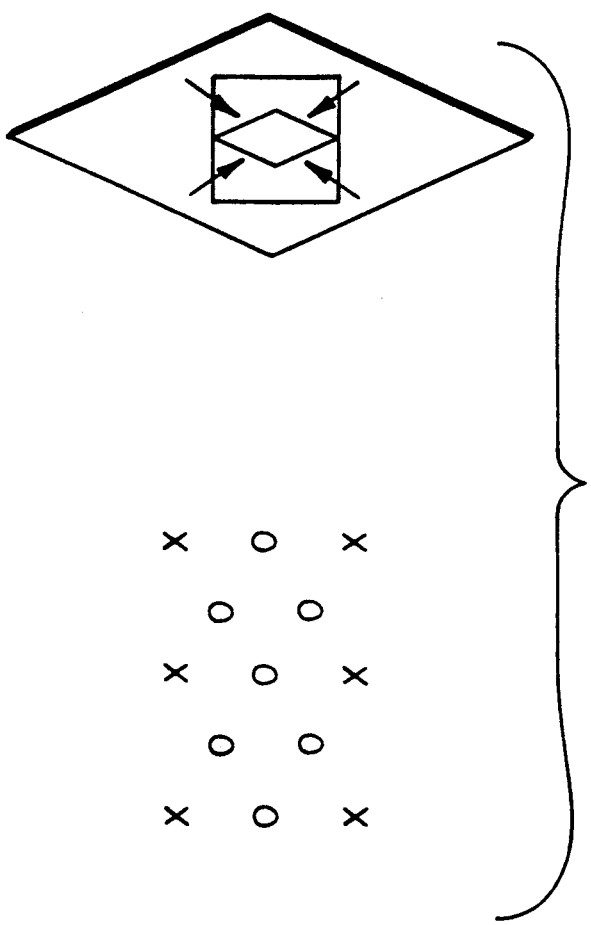
FIGS. 13a and 13b are diagrams illustrating example symmetries that can be generated by the method of this invention.
Figure 13B:
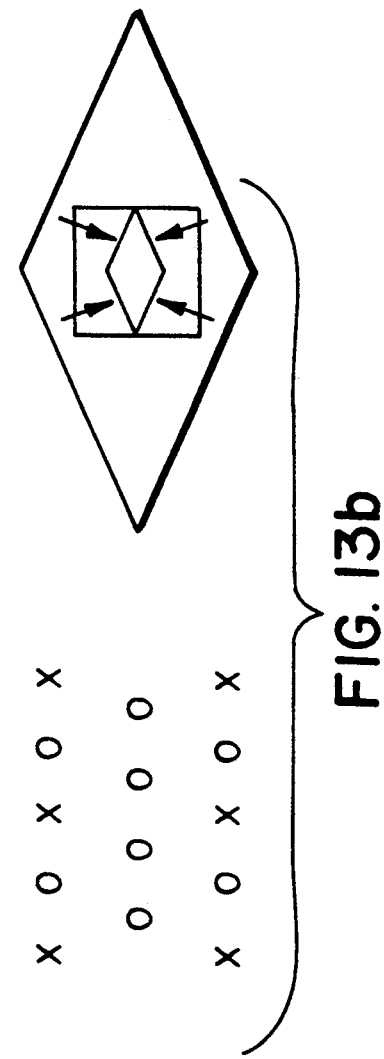

Although all the examples were for 45 and 135 degree diamond or quincunx symmetry, the method of this invention is completely general. The process of periodically upsampling, filtering with rotated one-dimensional filters, and raster downsampling can produce other symmetries as shown in FIG. 13.

Industrial Advantages and Applicability

The subsampling technique of the present invention is useful in any digital color imaging system for isolating non-rectangular Nyquist regions for image compression, segmentation, modeling, or analysis. The advantage of non-rectangular regions in any of these image processing tasks in that images and the human visual system exhibit diamond rather than rectangular symmetry. Prior to this invention such non-rectangular subsampling or image decomposition required non-separable, two-dimensional filters with order $M^2$ processing for MxM filters.

The advantages of this invention are the reduction of the required processing to order M, as well as the simplification of filter design from two dimensions to one dimension.

What is claimed is:

1. A method of subsampling a digital color image to decompose said image data into general periodic spatial frequency regions comprising the steps of:
    converting the input color image data into a chosen color space using a color transformation;
    unsampling said image by inserting pixel values of zero in the transformed data obtained in the previous step to modify the rectangular symmetry of the input color image data into a preferred symmetry;
    processing the upsampled image data using one-dimensional low-pass and high-pass filters and subsampling all of the color image data including the inserted pixel values at a first angle so as to be aligned with the periodicity of the upsampled image; and
    processing the resultant subsampled image data using one-dimensional low-pass and high-pass filters and subsampling all of the data remaining after the previous step at a second angle orthogonal to said first angle.

2. The method of subsampling set forth in claim 1 wherein the chosen space is visually uniform color space having separate luminance and chrominance.

3. The method of subsampling set forth in claim 1 wherein the first angle is 45° to said input color image.

4. The method of subsampling set forth in claim 3 wherein the preferred symmetry is quincunx symmetry.

5. The method of subsampling as set forth in claim 1 wherein the first angle is 30° to said input color image.

6. The method of subsampling as set forth in claim 4 wherein the color transformation is CIELAB.

7. The method of subsampling as set forth in claim 4, wherein the color transformation is CIELUV.

8. The method of subsampling as set forth in claim 4 is used to decompose color image data is associated with digital image coding.

9. The method of subsampling as set forth in claim 4 is used to decompose the color image data associated with high-definition-television coding.

10. The method of subsampling as set forth in claim 1 wherein the first angle is 60° to said input color image.

* * * * *